(12) United States Patent
Reichel et al.

(10) Patent No.: US 12,377,814 B2
(45) Date of Patent: Aug. 5, 2025

(54) VEHICLE, APPARATUS, AND METHOD FOR SENSOR-BASED CONFIGURATION OF AN APPROACH DETECTION FOR THE VEHICLE

(71) Applicant: Dr. Ing. h.c. F. Porsche Aktiengesellschaft, Stuttgart (DE)

(72) Inventors: Christopher Reichel, Benningen am Neckar (DE); Christoph Schenk, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 118 days.

(21) Appl. No.: 18/224,158

(22) Filed: Jul. 20, 2023

(65) Prior Publication Data
US 2024/0034273 A1 Feb. 1, 2024

(30) Foreign Application Priority Data
Jul. 27, 2022 (DE) .................... 10 2022 118 777.2

(51) Int. Cl.
*B60R 25/30* (2013.01)
*B60R 25/102* (2013.01)
*G06V 20/56* (2022.01)

(52) U.S. Cl.
CPC .......... *B60R 25/305* (2013.01); *B60R 25/102* (2013.01); *G06V 20/56* (2022.01); *B60R 2325/205* (2013.01)

(58) Field of Classification Search
CPC ............... B60R 25/305; B60R 25/102; B60R 2325/205; G06V 20/56
See application file for complete search history.

(56) References Cited

U.S. PATENT DOCUMENTS

| | | | | |
|---|---|---|---|---|
| 5,600,323 | A * | 2/1997 | Boschini | G07C 9/00182 341/173 |
| 10,821,937 | B1 | 11/2020 | Salter et al. | |
| 10,991,188 | B2 | 4/2021 | Woo | |
| 11,722,843 | B2 * | 8/2023 | Pylappan | H04L 67/53 340/686.6 |
| 11,749,116 | B1 * | 9/2023 | Young | B60K 35/28 340/932.2 |
| 12,139,130 | B2 * | 11/2024 | Tagawa | B62D 15/0275 |
| 12,254,701 | B2 * | 3/2025 | Miyamoto | G06V 20/58 |
| 2006/0290503 | A1 * | 12/2006 | Sumida | B60R 25/24 340/572.1 |

(Continued)

FOREIGN PATENT DOCUMENTS

| | | |
|---|---|---|
| DE | 102013221650 A1 | 4/2015 |
| DE | 102020125765 A1 | 4/2021 |

(Continued)

*Primary Examiner* — Muhammad Adnan
(74) *Attorney, Agent, or Firm* — Buchanan Ingersoll & Rooney PC

(57) ABSTRACT

A method and apparatus for sensor-based configuration of an approach detection for a vehicle. The apparatus includes a mechanism which is configured so as to determine a particular region to be monitored with the approach detection outside the vehicle as a function of at least one sensor signal of at least one sensor, in particular at least one camera, one infrasonic sensor, one ultrasonic sensor, one radar sensor, or one ultra-wideband sensor.

8 Claims, 3 Drawing Sheets

(56) References Cited

U.S. PATENT DOCUMENTS

| | | | |
|---|---|---|---|
| 2007/0024121 A1* | 2/2007 | Teshima | B60R 25/245 |
| | | | 307/10.2 |
| 2014/0310594 A1* | 10/2014 | Ricci | G06Q 10/00 |
| | | | 715/702 |
| 2015/0219760 A1* | 8/2015 | Hiramaki | B62D 15/0285 |
| | | | 367/99 |
| 2016/0214535 A1 | 7/2016 | Penilla et al. | |
| 2017/0327079 A1* | 11/2017 | Grossmann | H04W 4/023 |
| 2017/0353838 A1* | 12/2017 | Siswick | G07C 9/00309 |
| 2018/0103414 A1* | 4/2018 | Golsch | G01S 13/765 |
| 2019/0023223 A1* | 1/2019 | Yoo | B60R 25/043 |
| 2019/0202444 A1* | 7/2019 | Golgiri | H04W 4/40 |
| 2019/0360257 A1* | 11/2019 | Gocke | G05B 19/042 |
| 2020/0086829 A1* | 3/2020 | Wall | B60R 25/22 |
| 2020/0198581 A1* | 6/2020 | Ette | B60R 25/31 |
| 2020/0209878 A1* | 7/2020 | Shoda | B60W 10/20 |
| 2021/0246708 A1* | 8/2021 | Mönig | B62D 33/0273 |
| 2022/0161783 A1* | 5/2022 | Golgiri | G06V 20/588 |
| 2022/0340142 A1* | 10/2022 | Shimizu | B60W 50/0097 |
| 2022/0379879 A1* | 12/2022 | Kitaura | B60W 40/076 |
| 2023/0373437 A1* | 11/2023 | Baruco | B60R 25/305 |

FOREIGN PATENT DOCUMENTS

| | | |
|---|---|---|
| DE | 102021101377 A1 | 7/2021 |
| EP | 3626548 A1 | 3/2020 |

* cited by examiner

VEHICLE, APPARATUS, AND METHOD FOR SENSOR-BASED CONFIGURATION OF AN APPROACH DETECTION FOR THE VEHICLE

CROSS-REFERENCE TO RELATED APPLICATION

This application claims priority to German Patent Application No. 10 2022 118 777.2, filed Jul. 27, 2022, the content of such application being incorporated by reference herein in its entirety.

FIELD OF THE INVENTION

The invention relates to a vehicle, an apparatus, and a method for sensor-based configuration of an approach detection for the vehicle.

BACKGROUND OF THE INVENTION

For example, the approach detection is performed as a function of a distance of an operator from the vehicle by means of GEO fencing or Bluetooth Low Energy (BTLE) advertising or Mobile Device Key (MDK) locating or Radio Remote Control (RRC) locating.

The approach detection is a technical basis for an automatic response of the vehicle, e.g., in order to influence an operator experience while entering and exiting the vehicle when the operator is standing in an outer region of the vehicle or approaching the vehicle.

EP 3626548 A1, which is incorporated by reference herein, discloses a method for unlocking a vehicle using a terminal associated therewith.

SUMMARY OF THE INVENTION

The apparatus for sensor-based configuration of an approach detection for a vehicle comprises a means, which is configured so as to determine a particular region to be monitored with the approach detection outside the vehicle as a function of at least one sensor signal of at least one sensor, in particular at least one camera, one infrasonic sensor, one ultrasonic sensor, one radar sensor, or one ultra-wideband sensor.

The means is preferably configured so as to determine a plurality of particular regions to be monitored with the approach detection outside the vehicle as a function of the at least one sensor signal of the at least one sensor.

The means is preferably configured so as to determine the particular region or regions to be monitored as a function of a plurality of sensor signals by means of a sensor fusion as a function of the signals from at least two of the sensors.

The means is preferably configured so as to detect at least one object in a parked position of the vehicle and to determine an environmental situation and/or the particular region or regions to be monitored as a function of the object, in particular as a function of the environmental situation.

The means is preferably configured so as to output possible trigger regions of the approach detection by means of the detected environmental situation as a configuration option for an operator of the vehicle and/or to detect a selection of at least one trigger region and to determine the particular region outside the vehicle that is to be monitored as a function of the selection.

The method for sensor-based configuration of an approach detection for a vehicle provides that a particular region to be monitored with the approach detection outside the vehicle as a function of at least one sensor signal of at least one sensor, in particular at least one camera, one infrasonic sensor, one ultrasonic sensor, one radar sensor, or one ultra-wideband sensor.

Preferably, a plurality of particular regions to be monitored with the approach detection outside the vehicle are determined as a function of the at least one sensor signal of the at least one sensor.

The particular region to be monitored is preferably determined as a function of a plurality of sensor signals by means of a sensor fusion as a function of the signals from at least two of the sensors, or particular regions to be monitored are determined as a function of a plurality of sensor signals by means of a sensor fusion as a function of the signals from at least two of the sensors.

It is preferably provided that at least one object is detected in a parked position of the vehicle, and an environmental situation and/or the particular region to be monitored is determined as a function of the object, in particular as a function of the environmental situation, or particular regions to be monitored are determined as a function of the object, in particular as a function of the environmental situation.

Preferably, it is provided that possible trigger regions of the approach detection are output by means of the detected environmental situation as a configuration option for an operator of the vehicle and/or a selection of at least one trigger region is detected and the particular region outside the vehicle that is to be monitored is determined as a function of the selection.

A vehicle comprising the apparatus is also provided.

BRIEF DESCRIPTION OF THE DRAWINGS

Further advantageous embodiments will emerge from the following description and the drawing. The drawing shows.

DETAILED DESCRIPTION TO THE INVENTION

Figure 1:
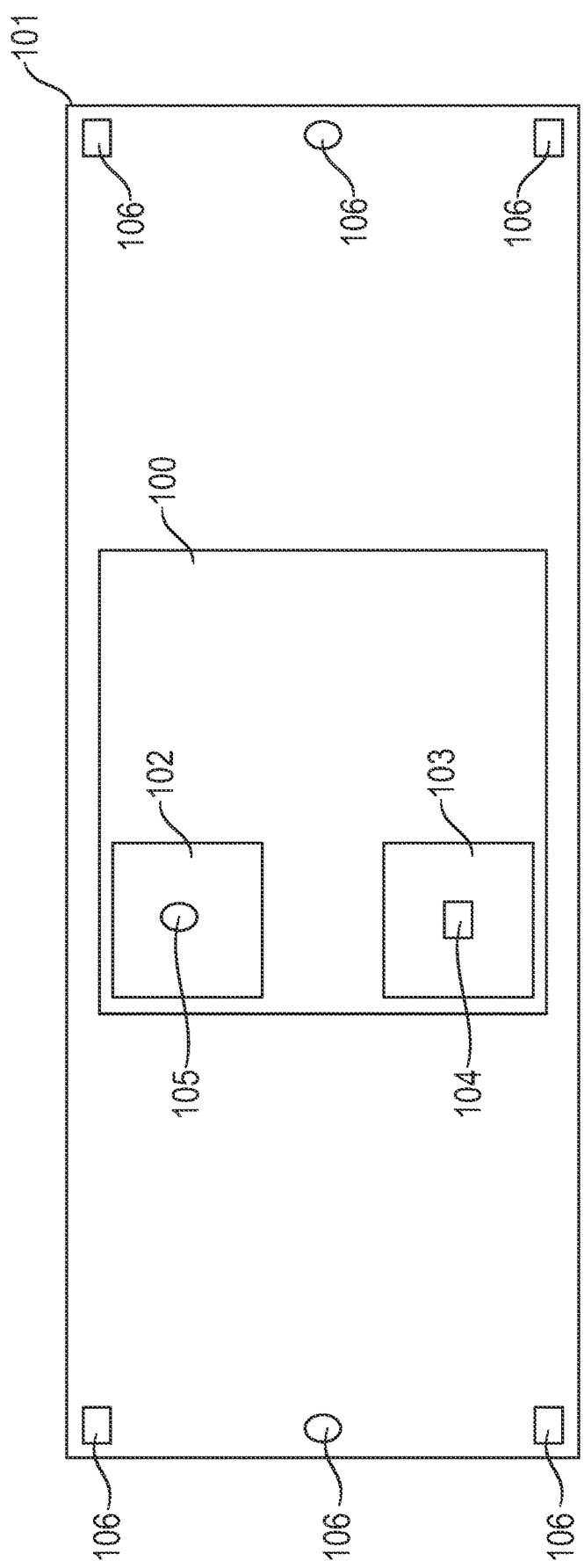
FIG. 1 is a schematic view of an apparatus for approach detection for a vehicle.

In FIG. 1, an apparatus 100 for approach detection for a vehicle 101 is shown schematically.

The apparatus 100 comprises a means 102 for detecting a distance of an operator from the vehicle 101, e.g., via GEO fencing or BTLE advertising or MDK locating or RRC locating of a monitored mobile device.

The apparatus 100 comprises a means 103 for causing a response of the vehicle 101 or for suppressing a response of the vehicle 101 as a function of the detected distance.

The means 102 for detecting the operator's distance from the vehicle 101 and the means 103 for causing the vehicle 101 to respond comprises, in the example, respective instructions and at least one (computer) processor 104 configured so as to execute the instructions in order to perform a method for approach detection as described below.

In the example, the means 102 for detecting the distance of the operator from the vehicle 101 comprises at least one antenna 105.

In the example, the vehicle 101 comprises at least one sensor 106. The sensor is, for example, a camera, an infrasonic sensor, an ultrasonic sensor, a radar sensor, or an ultra-wideband sensor. In the example, at its front and rear sides, the vehicle 101 comprises a respective central camera and a plurality of ultrasonic sensors.

The means 102 for detecting the distance of the operator from the vehicle 101 is configured so as to determine a particular region outside the vehicle 101 as a function of at least one sensor signal of one of the sensors 106. It can be provided that the means 102 for detecting the distance of the operator from the vehicle 101 is configured so as to determine a plurality of particular regions outside the vehicle 101.

The means 102 for detecting the distance of the operator from the vehicle 101 is, in one example, configured so as to determine the particular region or regions as a function of a plurality of sensor signals by means of a sensor fusion as a function of the signals from at least two of the sensors 106.

The means 102 for detecting the distance of the operator from the vehicle 101 is, in one example, configured so as to detect and evaluate objects detected around a parked position of the vehicle 101. The means 102 for detecting the distance of the operator from the vehicle 101 is, in one example, configured so as to store these objects and the parked position.

The means 102 for detecting the distance of the operator from the vehicle 101 is, in one example, configured so as to detect an environmental situation by means of the detected objects. The environmental situation includes, for example, parking in a carport or in a garage, parking next to another vehicle or next to other vehicles, parking at a fence or at fences or at a wall or at walls, or next to an obstacle or next to obstacles.

The means 102 for detecting the distance of the operator from the vehicle 101 is configured, in one example, so as to output, by means of the detected environmental situation, possible approach detection trigger regions as a configuration option for the operator of the vehicle 101.

The means 102 for detecting the distance of the operator from the vehicle 101 is configured, in one example, so as to show a display of configuration options on a display screen in the vehicle or on a display screen of a mobile terminal.

The means 102 for detecting the distance of the operator from the vehicle 101 is configured, in one example, so as to detect a selection of at least one trigger region.

The means 102 for detecting the distance of the operator from the vehicle 101 is configured, in one example, so as to allow the operator to show or hide a trigger region. Showing means, for example, that the trigger region is added to the selection. Hiding means, for example, that the trigger region is not added to the selection.

The means 102 for detecting the distance of the operator from the vehicle 101 is configured, in one example, so as to determine the particular region outside the vehicle 101 that is to be monitored as a function of the selection.

The following options are provided, for example, in order to detect the distance:

GEO Fencing

In GEO fencing, a GEO fence is defined around the vehicle 101. The GEO fence comprises the particular region outside the vehicle 101. This can be specified statically or can be set, for example, by the operator, in particular by means of an application. For example, the application comprises a user interface on a mobile terminal that interacts with an interface configured for this purpose in the vehicle 101.

After a journey with the vehicle 101, a last position of the mobile terminal or the vehicle 101 is determined, for example with a satellite-based navigation system, and stored in the application. When the user leaves the defined GEO fence with his or her mobile terminal, the approach detection is activated. Upon re-entering the particular region of the vehicle 101, the application sends a notification to the interface in the vehicle 101, which can trigger a response of the vehicle 101.

BTLE Advertising

In BTLE advertising, in particular when a selection lever of the vehicle 101 is switched to a parked position P, the vehicle 101 loses its readiness for travel and a BTLE roof antenna of the vehicle 101 is actuated so as to cyclically search for BTLE devices coupled to the vehicle 101 in a monitored environment of the vehicle 101. In the example, coupled BTLE devices are previously recognized as authorized. These are detected in a particular region around the vehicle 101, in particular within a remote field or a near field relative to the BTLE roof antenna. This can be specified statically or can be set, for example, by the operator, in particular by means of an application. This search remains enabled even when the vehicle 101 is powered off. With BTLE, for example, a BTLE zone of approximately 15-30 m around the vehicle 101 is monitored cyclically. This dynamically detects an approach of the coupled BTLE device in the remote field and the near field. When the user exits the particular region within the monitored BTLE zone with his or her coupled BTLE device, the approach detection is activated. When the coupled BTLE device exits the monitored environment of the vehicle 101, the approach detection for this device is disabled. Upon re-entering the BTLE zone, the BTLE device is re-coupled, and the approach detection is either started directly or, via the application, a notification is sent to the interface in the vehicle 101 that enables the approach detection. Upon re-entering the particular region of the vehicle 101, the application sends a notification to the interface in the vehicle 101, which can trigger a response of the vehicle 101.

MDK Locating

In MDK locating, in particular when a selection lever of the vehicle 101 is switched to the parked position P, the vehicle 101 loses its readiness for travel and a driving authorization system actuates a Relay Station Attack Defense (RSAD) transceiver of the vehicle 101 so as to cyclically search for MDK devices coupled to the vehicle 101 in a monitored environment of the vehicle 101. For example, the RSAD transceiver and the MDK device use BTLE and ultra-wideband (UWB) for communication. In the example, coupled MDK devices are previously recognized as authorized. Coupled MDK devices are thus detected in particular within a remote field or a near field with respect to the RSAD transceiver. MDK locating cyclically monitors a particular region around the vehicle 101, in particular a MDK zone of approximately 10 m around the vehicle. This can be specified statically or can be set, for example, by the operator, in particular by means of an application for a configuration of the MDK location of the vehicle 101. This search remains enabled even when the vehicle 101 is powered off. This dynamically detects an approach of the coupled MDK device in the remote field and the near field. When the user exits the particular region within the monitored MDK zone with his or her coupled MDK device, the approach detection is activated. When the coupled MDK device exits the monitored environment of the vehicle 101, the approach detection for this device is disabled. When entering the MDK zone again, the MDK device is detected again, and the approach detection is activated. For example, upon a change of the position of a detected MDK device in the MDK zone, its device identification, its region, e.g., its distance from the vehicle 101, and its position relative to the vehicle 101, e.g., the driver's side, the passenger's side, the front side, or the rear side, is determined. In the example, upon re-entering the particular region of the vehicle 101, a notification is determined, which can trigger a response of the vehicle 101.

RRC Locating

In RRC locating, in particular when a selection lever of the vehicle 101 is switched to the parked position P, the vehicle 101 loses its readiness for travel and a Low Frequency (LF) antenna and an RSAD transceiver of the vehicle 101 interacting with this antenna, which is configured so as to cyclically search for radio remote controls, is actuated so as to cyclically search for RRC devices coupled to the vehicle 101 in a monitored environment of the vehicle 101. The RSAD transceiver and the RRC device use low frequency, e.g., 125 kHz, for the approach detection, and e.g., ultra wideband (UWB) for communication. In the example, coupled RRC devices are previously recognized as authorized. These are detected in a particular region around the vehicle 101, in particular within a remote field or a near field relative to the LF antenna. This can be specified statically or can be set, for example, by the operator, in particular by means of an application. This search remains enabled even when the vehicle 101 is powered off. With LF, for example, an LF zone of approximately 6 m around the vehicle 101 is monitored cyclically. This dynamically detects an approach of the coupled RRC device in the remote field and the near field. When the user exits the particular region within the monitored LF zone with his or her coupled RRC device, the approach detection is activated. When the coupled RRC device exits the monitored environment of the vehicle 101, the approach detection for this device is disabled. When entering the LF zone again, the RRC device is detected again, and the approach detection is activated. For example, upon a change of the position of a detected RRC device in the LF zone, its region, e.g., its distance from the vehicle 101, and its position relative to the vehicle 101, e.g., the driver's side, the passenger's side, the front side, or the rear side, is determined. In the example, upon re-entering the particular region of the vehicle 101, a notification is determined, which can trigger a response of the vehicle 101.

The response of the vehicle includes, for example, a function that is performed when the notification arrives.

The approach detection can provide a plurality of particular regions around the vehicle 101. Different regions around the vehicle 101 can be associated with different notifications that can trigger different responses of the vehicle 101.

Figure 2:
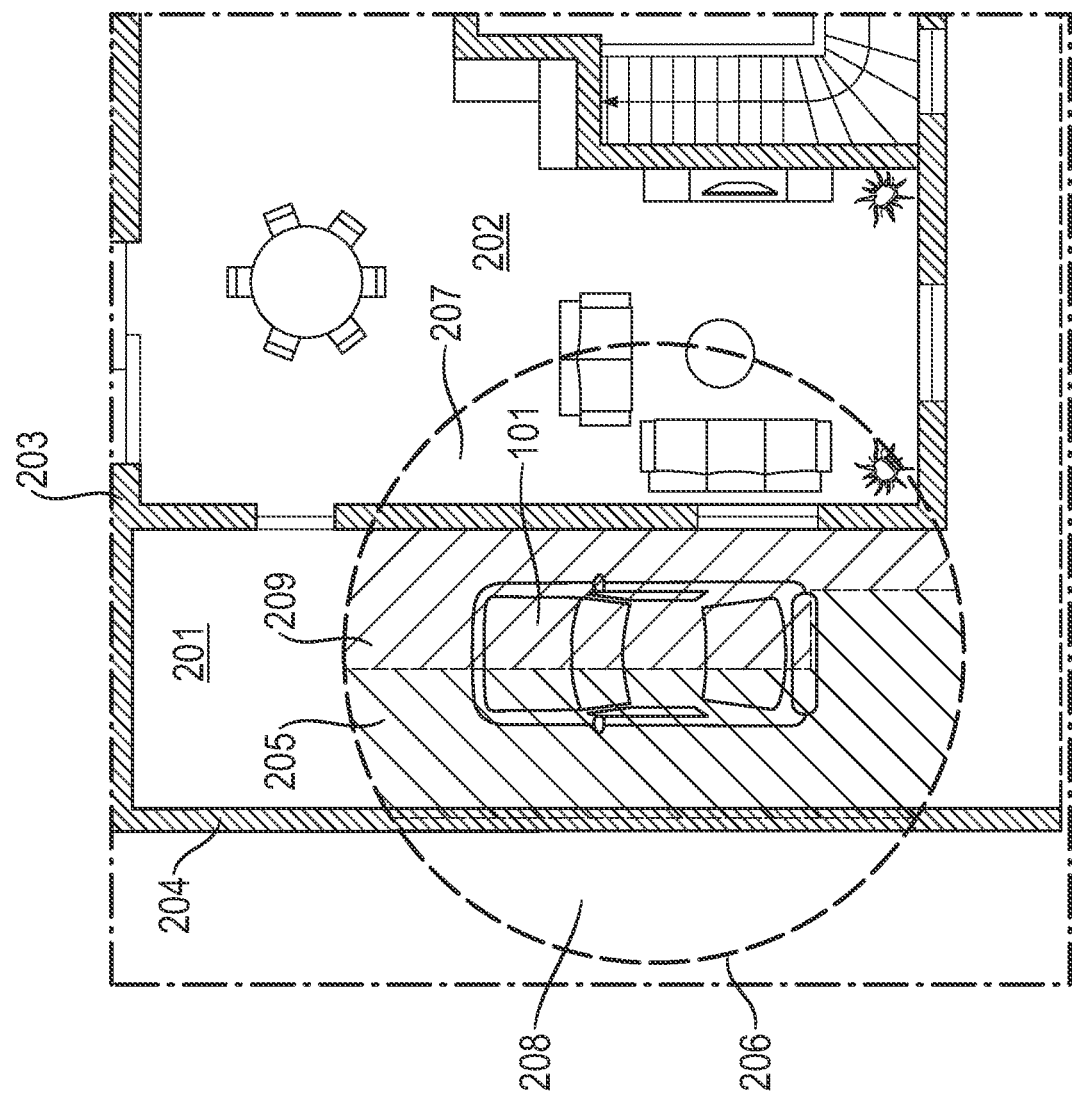
FIG. 2 is a schematic view of zone regions around a vehicle with the apparatus for approach detection.

In FIG. 2, an aerial view of a plurality of zone regions around the vehicle 101 is shown schematically. In the example, the zone regions have a three-dimensional spatial expansion. The vehicle 101 in the illustrated example is parked forwards in a carport 201, which is arranged adjacent to a room 202 for dining and relaxing. The carport 201 and the space 202 are separated on a passenger side of the vehicle 101 by a wall 203. On an operator side of the vehicle 101, the carport is bounded by a wall 204.

One of the zone regions is, for example, the particular region 205 around the vehicle 101 that is monitored via GEO fencing or BTLE advertising or MDK locating or RRC locating. A range 206 of the monitoring via GEO fencing or BTLE advertising or MDK locating or RRC locating also comprises, in the example, regions 207, 208 outside the carport 201. The range 206 in the example also comprises a region 209 in the carport 201 that is outside the particular region 205 around the vehicle 101. In the example, the particular region 205 extends within range 206 on an operator-side half of the vehicle 101 up to the wall 204 and on a rear of the vehicle 101.

In the example, the zone regions are or are not associated with a response, as follows.

The particular region 205 is associated with a response of the vehicle 101. The other regions 207, 208, 209 are not associated with a response of the vehicle 101. That is to say, an approach will in particular not trigger a response when the user passes the vehicle 101 with the monitored mobile device on the passenger side, or when the monitored mobile device is in the room 202.

The zone regions can be arranged in a different way. Different zone regions can be associated with different responses. For example, the particular region 205 is arranged within the range 206 between the walls 203 and 204, i.e., there is no unmonitored region within the range 206 in the carport 201. In another configuration, the particular region 205 can be defined by a substantially cuboid region within the range 206 and the carport 201.

For example, a distance is provided for a length or width or height of the respective zone regions. The height is relevant, for example, when the vehicle 101 is parked below a room.

Figure 3:
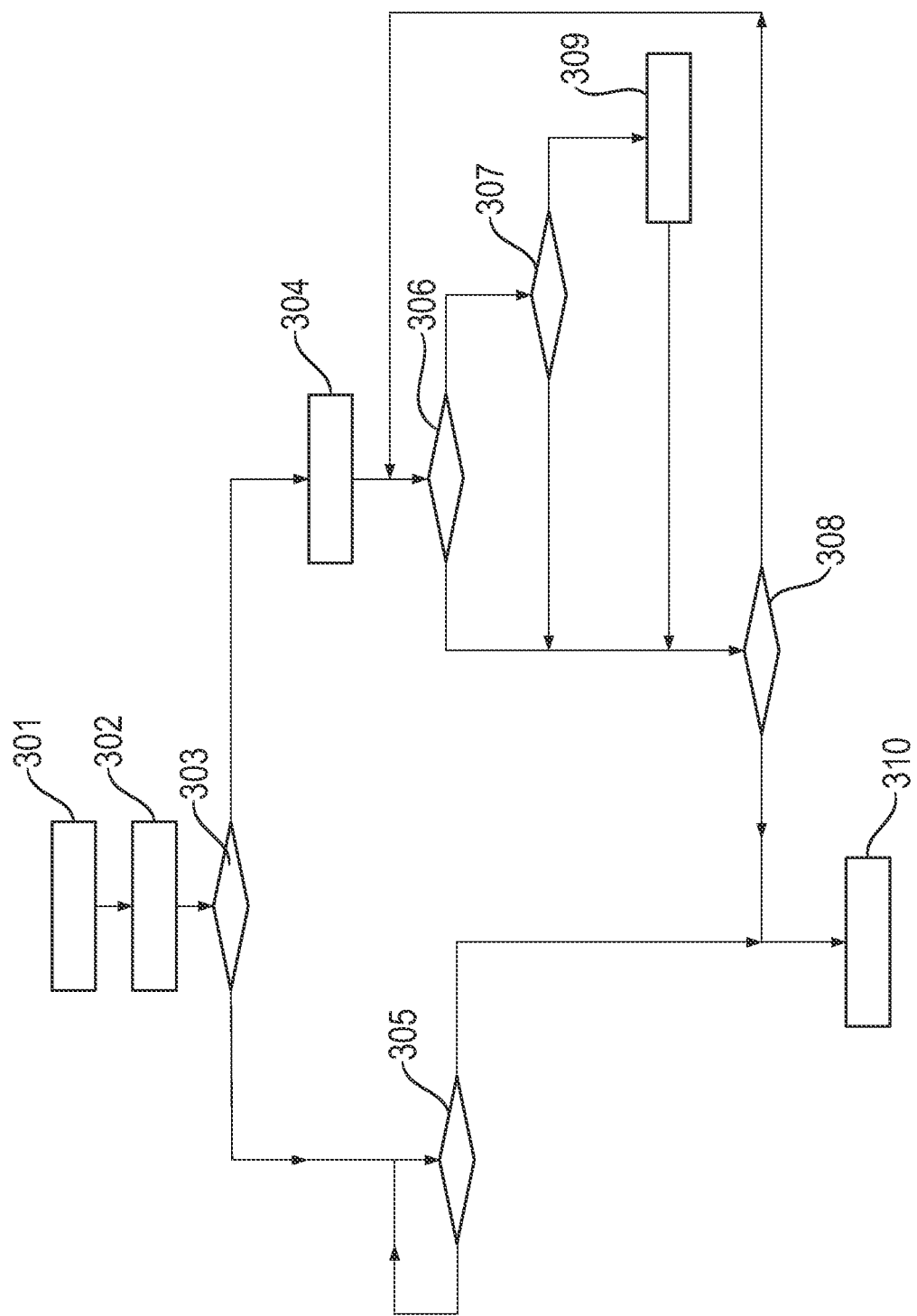
FIG. 3 is a flowchart for a method for approach detection for a vehicle.

In FIG. 3, a method for approach detection is shown.

The method comprises a step 301.

In step 301, after a journey with the vehicle 101, a last position of the vehicle 101, e.g., a geographic position xyz, is stored.

Then, a step 302 is performed.

In step 302, the approach detection is configured.

In the example, at least one region to be monitored is provided.

The at least one region to be monitored is determined by means of a signal of at least one of the sensors 106.

For example, a distance is determined to be near, medium, far, or an individually adjusted distance by means of the signal from the at least one sensor 106.

The distance can be different in different spatial directions. For example, the distance is provided for a length or width or height.

The zone regions are determined, for example, by means of the signal of the at least one sensor 106 and are configurable, for example, via a vehicle display or an application on a mobile terminal.

In the example, at least one particular region outside the vehicle 101 is determined as a function of at least one sensor signal from one of the sensors 106. It can be provided that a plurality of different particular regions outside the vehicle 101 are determined.

It can be provided that the particular region or regions are determined as a function of a plurality of sensor signals by means of a sensor fusion as a function of the signals from at least two of the sensors 106.

It can be provided that objects detected around a parked position of the vehicle 101 are detected and evaluated. It can be provided that these objects and the parked position are stored.

It can be provided that an environmental situation is detected by means of the detected objects. The environmental situation includes, for example, parking in a carport or in a garage, parking next to another vehicle or next to other vehicles, parking at a fence or at fences or at a wall or at walls, or next to an obstacle or next to obstacles.

It can be provided that, by means of the detected environmental situation, possible trigger regions of approach detection are output as a configuration option for the operator of the vehicle 101.

It can be provided that a display of the configuration options is shown on a screen in the vehicle 101 or on a screen of a mobile terminal.

It can be provided that a selection of at least one trigger region is detected.

It can be provided that the operator is allowed to show or hide a trigger region. Showing means, for example, that the trigger region is added to the selection. Hiding means, for example, that the trigger region is not added to the selection.

It can be provided that the particular region outside the vehicle 101 that is to be monitored is determined as a function of the selection.

The at least one region to be monitored in this way is specified statically, e.g., as the default. A clearance protection, which can prevent unwanted vehicle activation, can be implemented. This has a clearance protection threshold that is statically specified or individually adjustable by the user.

For example, the following zones are determined:

Monitoring of a zone 1 of the zone regions, e.g., via GEO fencing, permanently deactivated at a geographic position xyz. Monitoring of zone 1 of the zone regions, e.g., via GEO fencing, permanently in particular at a distance of near, medium, far, or an individually adjusted distance activated at a geographic position xyz.

Monitoring of a zone 2 of the zone regions, e.g., via BTLE advertising, permanently deactivated at a geographic position xyz. Monitoring of zone 2 of the zone regions, e.g., via BTLE advertising, permanently in particular at a distance of near, medium, far, or an individually adjusted distance activated at a geographic position xyz.

Monitoring of a zone 3 of the zone regions, e.g., via MDK locating, permanently deactivated at a geographic position xyz. Monitoring of zone 3 of the zone regions, e.g., via MDK locating, permanently in particular at a distance of near, medium, far, or an individually adjusted distance activated at a geographic position xyz.

Monitoring of a zone 4 of the zone regions, e.g., via RRC locating, permanently deactivated at a geographic position xyz. Monitoring of zone 4 of the zone regions, e.g., via RRC locating, permanently in particular at a distance of near, medium, far, or an individually adjusted distance activated at a geographic position xyz.

For example, the distance is determined as a function of at least one object that has been detected by at least one of the sensors 106. For example, for an object that is near, the distance "near" is determined. For example, for an object that is far, the distance "far" is determined. For example, for an object that is between near and far, the distance "medium" is determined. For example, for an object, its distance to the vehicle 101 is determined, and the individually adjusted distance is determined as the distance or as a function of the distance.

It can be provided that the user can be offered the option of not providing a region to be monitored for a next locking cycle. This means that no monitoring takes place.

Then, a step 303 is performed.

In step 303, it is checked whether at least one region to be monitored is provided. If at least one region to be monitored is provided, a step 304 is performed. Otherwise, a step 305 is performed.

In step 304, the monitoring of the at least one region to be monitored is started.

Then, a step 306 is performed.

In step 306, it is checked whether an approach of a mobile device to be monitored is detected. When the approach of the mobile device to be monitored is detected, a step 307 is performed. Otherwise, a step 308 is performed.

In step 307, it is checked whether the approach of the mobile device to be monitored is detected in at least one region to be monitored. When the approach of the mobile device to be monitored is detected in at least one region to be monitored, a step 309 is performed. Otherwise, the step 308 is performed.

In step 309, a notification that can trigger a response of the vehicle 101 is determined. The notification is determined in the example as a function of the region to be monitored in which the mobile device to be monitored is detected. Then, the step 308 is performed.

In step 308, it is checked whether a locking cycle has finished. When the locking cycle is finished, a step 310 is performed. Otherwise, the step 306 is performed.

In step 305, it is checked whether a locking cycle has finished. When the locking cycle is finished, step 310 is performed. Otherwise, step 305 is performed.

In step 310, the method is ended. For example, the last position is deleted and, if monitoring has been started, it is ended.

It can be provided that at least one region to be monitored for the approach detection is determined by means of a software component with artificial intelligence.

It can be provided that at least one period of time to be monitored for the approach detection is determined by means of the software component or another software component with artificial intelligence.

In the example, the software component is configured so as to capture information about actual vehicle usage, i.e., a usage behavior of a user. For example, the respective parked position, e.g., the geographic position xyz, and the respective region or regions to be monitored over a specified period of time, e.g., 4 to 6 weeks, are detected and the artificial intelligence trains e.g., with this training data for a parked position in order to predict whether or not an approach detection is to be performed, or to predict which region is to be monitored or which regions are to be monitored.

For example, the following sensor signals are detected as training data:

The parked position, camera images, echoes of infrasonic signals, ultrasonic signals, and/or radar signals detected in the parked position, and a selection of the particular region or regions that the user has selected for monitoring. For example, the artificial intelligence is configured so as to predict at least one particular region to be monitored.

For example, the following usage behavior is detected as training data:

When the vehicle 101 is in a home zone, the user uses the vehicle 101 to travel to his or her worksite Monday through Friday in a time period between 8:00 a.m. and 10:00 a.m. During this period, the approach detection, i.e., the monitoring of the home zone, is activated in a time-configured manner.

When the vehicle 101 is in a work zone, the user uses the vehicle 101 Monday through Friday in a time period between 4:00 p.m. to 6:00 p.m. During this period, the approach detection, i.e., the monitoring of the work zone, is activated in a time-configured manner.

If the vehicle 101 is in a home zone, the user will not use the vehicle 101 on the weekend.

The artificial intelligence is trained as a function of this training data, for example, to deactivate the approach detection, i.e., the monitoring, outside of the periods between 8:00 a.m. to 10:00 a.m. and between 4:00 p.m. to 6:00 p.m. on weekdays. That is to say, the vehicle 101 will not respond outside of these periods if the user is moving or in standing near the otherwise monitored device.

For example, the artificial intelligence is self-learning, i.e., no operator interaction is required. It can also be provided that an operator interaction is provided in order to release or transmit the prediction of the time periods.

Further situations can also be considered in this manner.

The software component can be trained or configured so as to detect an upcoming long or unscheduled non-use of the vehicle 101 situationally at particular locations, e.g., an airport, and recommend to the user a deactivation of the approach detection for a time-configurable period, in particular one time.

The software component can be trained or configured so as to detect an increasing number of uses of the vehicle 101 in front before which the approach detection did not detect an approach. The software component can be trained or configured so as to detect too many erroneous or unwanted responses of the vehicle 101 or detected approaches without subsequent use of the vehicle 101, and then recommend that the user modify a period of time or periods of time during which approach detection, i.e., the monitoring of the region to be monitored, is active.

The software component can be trained or configured so as to make the prediction individually per parked position. The software component can be trained or configured so as to assess new or rarely used parked positions as relevant or irrelevant, in particular as a function of a frequency of use. For example, the software component is trained or configured so as to make predictions or recommendations for new parked positions only after a period of approximately 6 weeks in which the new parked position is used a multiple times.

It is to be understood that the operational steps are performed by the computer controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

What is claimed is:

1. An apparatus for sensor-based configuration of an approach detection for a vehicle, said apparatus comprising:
   means configured to determine a particular region to be monitored with the approach detection outside the vehicle as a function of at least one sensor signal of at least one sensor,
   wherein the at least one sensor is a camera, infrasonic sensor, ultrasonic sensor, radar sensor, or ultra-wideband sensor,
   wherein the means is configured to detect at least one object in a parked position of the vehicle and to determine an environmental situation and/or the particular region or regions to be monitored as a function of the object or the environmental situation, and
   wherein the means is configured to output possible trigger regions of the approach detection by means of the determined environmental situation as a configuration option for an operator of the vehicle and/or to detect a selection of at least one trigger region and to determine the particular region outside the vehicle that is to be monitored as a function of the selection.

2. The apparatus according to claim 1, wherein the means is configured to determine a plurality of particular regions to be monitored with the approach detection outside the vehicle as a function of the at least one sensor signal of the at least one sensor.

3. The apparatus according to claim 1, wherein the means is configured to determine the particular region or regions to be monitored as a function of a plurality of sensor signals by way of a sensor fusion as a function of the signals from at least two of the sensors.

4. A vehicle comprising the apparatus according to claim 1.

5. The apparatus according to claim 1, wherein the means is a computer processor.

6. A method for sensor-based configuration of an approach detection for a vehicle, said method comprising:
   monitoring a particular region with the approach detection outside the vehicle as a function of at least one sensor signal of at least one sensor, wherein the at least one sensor is a camera, infrasonic sensor, ultrasonic sensor, radar sensor, or ultra-wideband sensor;
   detecting at least one object in a parked position of the vehicle, and either (i) determining an environmental situation and/or the particular region to be monitored as a function of the object or the environmental situation, or (ii) determining particular regions to be monitored as a function of the object or the environmental situation; and
   (i) outputting possible trigger regions of the approach detection by way of the detected environmental situation as a configuration option for an operator of the vehicle and/or (ii) detecting a selection of at least one trigger region and determining the particular region outside the vehicle that is to be monitored as a function of the selection.

7. The method according to claim 6, further comprising determining a plurality of particular regions to be monitored with the approach detection outside the vehicle as a function of the at least one sensor signal of the at least one sensor.

8. The method according to claim 6, further comprising determining (i) the particular region to be monitored as a function of a plurality of sensor signals by way of a sensor fusion as a function of the signals from at least two of the sensors, or (ii) particular regions to be monitored as a function of a plurality of sensor signals by way of a sensor fusion as a function of the signals from at least two of the sensors.

* * * * *